Patented July 17, 1951

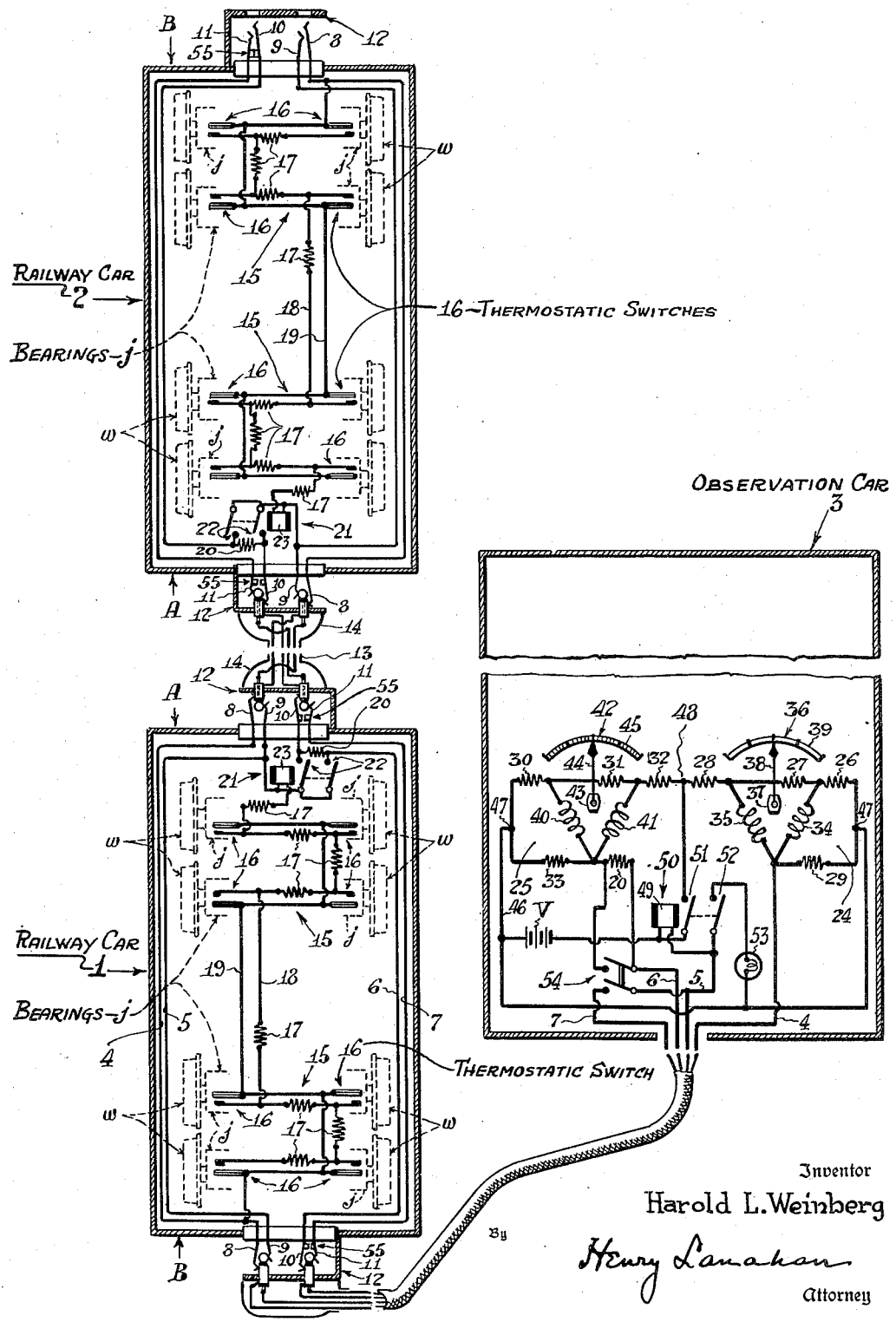

2,560,753

UNITED STATES PATENT OFFICE 2,560,753

BEARING ALARM SYSTEM FOR RAILWAY TRAINS

Harold L. Weinberg, Newark, N. J., assignor to Thomas A. Edison, Incorporated, West Orange, N. J., a corporation of New Jersey Application December 13, 1945, Serial No. 634,825

20 Claims. (Cl. 246—169)

This invention relates to systems for indicating conditions or quantities at a remote station. Among other applications, the invention has particular utility in connection with alarm systems, especially bearing alarm systems for railway trains, and it is in terms of this last application that I herein particularly describe my invention but without intending any unnecessary limitation thereto.

My invention is adapted particularly to the remote indication of any one of a number of conditions or quantities that are divided into groups, and operates to give two indications: one identifying the group and the other the particular condition or quantity of that group. In the application to a bearing alarm system for railway trains, the one indication identifies the car in which a bearing has become overheated, and the other indication identifies which bearing of that car is overheated, it being understood that the cars are intercoupled to a caboose, locomotive or to an observation car whereat an alarm will readily come to the attention of an attendant of the train. A particular advantage in this type of indicating system is that by the use of two or more indications a great number of different conditions or quantities can be indicated.

It is an object of my invention to provide a system of the character described which is inexpensive and easy to install, operate and maintain.

It is another object to provide a bearing alarm system for railway trains which permits interchange of the cars, reversal of the direction of any of the cars and variation of the number of the cars in the train without requiring any change in the manner of reading the system or in the general arrangement of the system other than that of keeping the cars connected sequentially in the system as the car changes are made.

It is another object to provide an improved alarm system for railway trains which requires no manual switching and which operates automatically to indicate the exact location of an overheated bearing of the train both as to the car and the position of the overheated bearing on that car.

It is a further object to provide an indicating system of the character described which requires no power except at the indicating station and which consumes no power except when an indication or alarm is being given.

It is another object to provide such a system which can be readily checked for continuity and operability.

It is another object to provide a simple indicating means for a bearing alarm system which is capable of checking all the bearings of railway trains of many or a few cars, and of giving an indication which enables the reader to ascertain immediately which bearing is overheated.

Other and allied objects and features of my invention will more fully appear from the following description and the appended claims.

In the description of my invention reference is had to the accompanying drawing, which is a diagrammatic view of circuits and mechanism according to a preferred embodiment of my invention.

The indicating system of my invention is illustrated in terms of a bearing alarm system for railway cars, and is adapted to give an alarm when a bearing is overheated and to indicate the exact location of that bearing in the train both as to the car and the number and/or position of the bearing on the car. In the accompanying drawing the system is shown for checking the bearings of two railway cars 1 and 2—which is illustrative of the application of the system to any number of cars—and the indicating and alarm apparatus is shown in a third car 3—herein termed the observation car as hereinbefore noted. Of course, the system may be used also for detecting any overheated bearing of the observation car if desired.

The system comprises preferably a bearing detecting circuit, which is for detecting the number or position of the overheated bearing on the respective cars, and a car detecting circuit which is for detecting the car having the overheated bearing. These circuits have one of their lines common, the term "line" being used to refer to a single lead wire running lengthwise of the train. The bearing detecting circuit comprises lines 4 and 5, and the car detecting circuit comprises lines 5 and 6. Additionally there is a fourth line 7 running lengthwise of the train, which is for testing the continuity and operability of the system as is herein described. The lines 4 to 7 inclusive connect to respective spring contact arms 8 to 11 inclusive of identical jacks 12 mounted at the ends of the cars, and are interconnected between cars by four conductor cables 13 having polarized plugs 14 at their ends for coupling with the jacks 12.

Connected in parallel across the lines 4 and 5 of the bearing detecting circuit are condition-responsive impedance control units for the respective cars of which each unit comprises two identical groups 15 of control devices for the respective trucks of the car, it being understood that each truck comprises four wheels w and respective bearings j as dottedly represented in the drawing. Each group 15 comprises four normally-open thermostats 16 (diagrammatically shown) which are suitably associated thermally with the respective bearings j of the truck so that the thermostats will close when the respective bearings are overheated to a dangerously high temperature. Additionally, each group 15 comprises an impedance element 17 for each thermostat, these elements being preferably identical resistances. These resistances 17 of the two groups 15 of each car are connected serially in a line 18 itself connected at one end to the line 5, the other end of the line 18 being free. In the line 18, beyond each resistor 17 with respect to the line 5, there is a switch contact of a respective one of the thermostats 16. The other switch contacts of these thermostats are serially connected in a line 19. The end of this line 19, which leads from the thermostat associated with the resistor 17 farthest removed in the line 18 from the line 5, is connected to the line 4. The resistances are preferably successively connected to the line 5 in such sequence that the corresponding bearings of the car run alternately from right to left and left to right along successive axles, proceeding from the so-called A to the B end of the car, when the car is viewed from the A end. Thus, it will be observed if the first bearing—the right bearing of the first axle at the A end of the car—is overheated, one of the resistances 17 is connected across the lines 4 and 5 of the bearing detecting circuit; if for example the sixth bearing—the left bearing of the third axle from the A end—is overheated, six of the resistances 17 are connected in series across the lines 4 and 5, etc. Thus, the number of the resistances which are connected across the lines 4 and 5 is an indication of the number and/or location of the overheated bearing on the car.

In the line 6 of the car detecting circuit there are serially included impedance elements—preferably identical resistors 20—of which there is one for each car 1 and 2 and an additional one on the observation car 3. On each car 1 and 2 there is also a double-pole relay 21 comprising two pairs of normally-open contacts 22 connected from opposite ends of the respective resistors 20 to the line 5, and an actuating coil 23 which is connected serially in the lead line 18 between the first of the resistances 17 therein and the line 5. When one of the bearings of the car is overheated, the bearing detecting circuit is closed and a current flows therein as is hereinafter explained. This current operates the respective relay 21 and closes the car detecting circuit at that car, but in doing so it shorts out the resistor 20 of that car. All of the resistors 20 in the car detecting circuit, which precede that car in the train, are thus connected serially in that circuit. Since there is one resistor 20 in the observation car, there are as many of the resistors 20 connected in the car detecting circuit as is the number of the car with the overheated bearing from the observation car.

In the observation car there are two electrical bridges 24 and 25 which are energizable by a source of potential, typically a battery V. The bridge 24 has one branch serially including three resistors 26, 27 and 28 and a second branch in parallel thereto which serially includes a resistor 29 and the bearing detecting circuit above described. The second bridge 25 has also one branch serially including three resistors 30, 31 and 32 and a second branch in parallel thereto which serially includes a resistor 33 and the car detecting circuit above described. Connected across the branches of the bridge 24, from the junction of the line 4 with the resistor 29 to the extremities of the central resistor 27 of the other branch, are two coils 34 and 35 of a ratiometer-type indicator 36 which is herein diagrammatically shown. This indicator comprises a pivoted magnet 37 carrying a pointer 38 which registers with a scale 39. Likewise, connected across the branches of the bridge 25, from the junction between the resistor 33 and the resistor 20 to the extremities of the central resistor 31 of the other branch, are two coils 40 and 41 of a second ratiometer-type indicator 42. This indicator comprises likewise a pivoted magnet 43 carrying a pointer 44 which registers with a scale 45. These ratiometer-type indicators and associated electrical bridges constitute resistance-measuring devices of the type described in detail in the Kelly Patent No. 2,362,562, and reference thereto may be had for a detailed description thereof. Suffice it to say for the present, with respect to the bridge 24 and ratiometer 36, that when a resistance is introduced in the bearing detecting circuit in response to an overheated bearing the ratio of the currents in the coils 34 and 35 is established according to the value of that resistance and the magnet 37 is deflected angularly on its pivot axis by the electromagnetic fields of those coils to a position whereat the pointer 38 indicates on a scale 39, upon the scale being properly calibrated, the number and location of the overheated bearing in the respective car. Similarly, when a bearing is overheated the ratiometer 42 indicates relative to the scale 45, upon this scale being properly calibrated, the number of the car in the train which has the overheated bearing.

The battery V has one side thereof connected permanently by a lead wire 46 to one side 47 of each of the bridges 24 and 25, and has a permanent connection to the line 4 through the bridge resistance 29 and to the line 6 through the resistances 33 and 20. The other side of the battery has a permanent connection to the common line 5 of the bearing and car detecting circuits, but is normally not connected to the other side 48 of each of the bridges 24 and 25. Thus, since the bearing and car detecting circuits are normally open, there is normally no current drain on the battery. The battery is however connected automatically to supply energizing current to the bridge circuits upon the bearing detecting circuit being closed in response to an overheated bearing. This is accomplished by a normally-open double-pole relay 50 having a coil 49 connected in the common line 5. One set of contacts 51 of this relay operate to connect the line to the bridges at 48. When the bearing detecting circuit is closed, the battery current supplied to this circuit energizes the coil 49 and operates the relay 50 to connect the battery across the bridges 24 and 25 and to put the system in operation. The other set of contacts 52 of the relay 50 are closed concurrently to connect the battery across a signalling device 53 which may be, for example, a lamp or a buzzer. When the overheated bearing is corrected and the respective thermostat is restored to open the bearing detecting circuit—which causes the car detecting circuit also to open by reason of none of the relays 21 being then energized—there is no longer any current flow in the line 5 to energize the relay 50, causing this relay therefore to open and again break the current supply to the bridges 24 and 25. Typically, the pivoted magnets of the ratiometer indicators are subjected to a constant torsional bias so that when the bridge circuits are no longer energized the pointers will be held at a zero position at one end of the respective scales.

The scale 39 of the ratiometer indicator 36 will have as many divisions as the number of bearings of each car—which is typically eight. The scale 45 of the indicator 42 will have as many divisions as the number of cars which the system is to serve. For example, say the meter has a scale 120° long and the system is to serve as many as forty cars, then the scale 45 will be graduated in three-degree intervals. These divisions of the scales may be numbered in sequence. Thus, for example, if an alarm is given and meter 36 reads 3 and meter 42 reads 27, the attendant will know immediately that the lefthand bearing of the second axle from the A end of car 27 in the train is overheated.

If a greater number of cars is to be served by the system, two ratiometer indicators and respective bridges may be connected to the car detecting circuit in place of the single ratiometer indicator and bridge as described, and one of these indicators may be adapted so that its pointer begins to indicate when the pointer of the other has moved off its scale according to the dual system described in the pending and commonly owned Postal application Serial No. 590,681, filed April 27, 1945, and now Patent No. 2,448,461, dated August 31, 1948. By this means twice as many cars may be served by the system.

The present system is adapted to work equally well regardless of the relative directions in which the cars are intercoupled in the train. This independence of the system to the direction of the cars is accomplished by the double-pole relays 21 since, upon the overheating of a bearing, these relays connect the lines 5 and 6 together and short the resistor 20 of the car having the overheated bearing, leaving only the resistors in the car detecting circuit which are between that car and the observation car 3. However, in order that there will be as many of these resistors in the car detecting circuit as is the number of the car in the train having the overheated bearing, there is provided the resistor 20 in the circuit at the observation car as above explained. For illustrative purposes, cars 1 and 2 are shown coupled in reverse directions. Were a bearing of car 2 overheated the relay 21 of that car would be closed, leaving two resistors 20 in the car detecting circuit—one in car 1 and one in car 3— to cause the indicator 42 to indicate car 2. If a bearing in car 1 is overheated, the resistor 20 of that car would be shorted out by the respective relay 21, leaving only the single resistor 20 of car 3 in the car circuit to cause the indicator 42 to indicate car 1. Obviously, the same results are had were one of cars 1 or 2 reversed with respect to the other.

In order to check the continuity of line 6 of the car detecting circuit there is provided the line 7. In this line there is a push-button switch 54 at the observation car for connecting it to the line 5 and thus to one side of the battery B. In each jack 12 there is a pair of contacts 55 carried by the spring arms 10 and 11 which connect the line 7 to the line 6 when the plug 14 is pulled from the jack. However, when the plug is in place the contacts 55 are held apart as shown. The jack at the far end of the last car of the train will have no plug inserted therein and the contacts 55 will here be closed to connect the test line 7 to the line 6 at the far end of the train with respect to the observation car. When the switch 54 is closed, current is supplied by the battery V at the far end of the line 6, the same as were the relay 21 of that car closed except that the resistor 20 of that car is now included also in the line 6. In order that the number of the resistors 20 in the line 6 will be the same as the number of the cars from the observation car to any point of discontinuity in that line between cars, the switch 54 is provided with a second pole which is connected across the resistor 20 of the observation car to short this resistor when the switch is closed. Thus, upon closing the switch 54, the meter will give an indication to enable the operator to check whether there is any discontinuity in the line 6 between cars and the place of that discontinuity.

While I have herein described my invention as working on a direct-current basis, it will be readily apparent to those skilled in the art that my invention may be practiced as well on an alternating-current basis. Such and other changes and modifications may be made in the preferred embodiment of my invention herein described without departing from the scope of my invention, which I endeavor to express according to the following claims.

I claim:

1. In an indicating system including a source of potential: the combination of a circuit connected to said source; a plurality of impedance control units connected in parallel in said circuit, each of said units comprising a plurality of control devices selectively operable for causing the unit to transmit currents of different strengths in said circuit from said source according to which control device is operated; a second circuit connected to said source and selectively controllable to pass currents of different strength; means responsive to current flow in said first circuit for controlling said second circuit to pass currents of different strength from said source according to which of said control units includes said operated control device; and indicating means for said circuits respectively.

2. In an indicating system including a source of potential: the combination of a first circuit; a plurality of similar condition-responsive impedance control units connected in parallel in said circuit, each of said units comprising a plurality of condition-responsive devices operable to cause the unit to transmit currents of different strength from said source in said circuit according to the relative positioning of the operated device in the unit; a second circuit connected to said source; electrically energizable control means respectively serially connected to said control units and effective upon one of said control devices being operated for varying the current in said second circuit in predetermined relation to the relative positioning of the control unit having said operated device; indicating means connected to said first circuit and calibrated to indicate the relative positioning of said operated device in its respective control unit; and indicating means connected to said second circuit and calibrated to indicate which of said several units includes said operated device.

3. The combination set forth in claim 2 comprising two electrical bridges for said indicating means, said first circuit comprising one branch of one of said bridges and said second circuit comprising one branch of the other of said bridges, and a relay responsive to flow of current in said first circuit for connecting the second branches of said bridges to said potential source.

4. In an indicating system including a source of potential: the combination of two electrical bridges, a plurality of open-circuit control units in one branch of one of said bridges each selectively operable to pass currents of different value through said one branch from said source, means responsive according to which of said control units is operated for passing current through one branch of the second of said bridges from said source, and means responsive to flow of current in said one branch of said one bridge for connecting the second branches of both of said bridges across said source.

5. In an indicating system including a source of potential: the combination of a first circuit; a plurality of similar condition-responsive impedance control units connected in parallel in said circuit, each of said units comprising a plurality of impedance elements and respectively associated switches operable to connect a predetermined number of said impedance elements in the circuit according to the positioning of the operated switch in its unit; a second circuit including impedance means; a relay operatively connected to each of said control units and responsive upon a switch in the corresponding one of said units being operated for varying the impedance in said second circuit according to which of said control units includes said operated switch; indicating means responsive according to the impedance in said first circuit for indicating the positioning of said switch in its unit; and indicating means responsive according to the impedance in said second circuit for indicating which of said units includes said operated switch.

6. In an indicating system: the combination of a first circuit; a first set of impedance control units connected in parallel in said circuit and respectively comprising a plurality of resistances and of respectively associated condition-responsive switches selectively operable to connect numbers of said resistances in said circuit in predetermined relation according to the relative positioning of the switches in said units respectively; a second circuit; a second set of other resistances; a relay associated with each of said other resistances, each of said relays having an actuating coil connected to said respective control unit and having contacts connected in said second circuit for connecting a predetermined number of said other resistances in said second circuit, upon one of said switches being operated, according to which of said control units includes said operated switch; electrical bridges connected in said circuits and having variable arms comprising the said resistances in said circuits respectively; a ratiometer connected to the bridge in said first circuit for indicating the position of said operated switch in its unit; and a ratiometer connected to the bridge in said second circuit for indicating which of said units includes said operated switch.

7. The combination set forth in claim 6 including a current-supply circuit for said bridges, a relay associated with said first circuit for normally opening said current-supply circuit, said relay being operated by the current in said first circuit upon the closing of one of said switches for closing said current-supply circuit.

8. The combination set forth in claim 6 including a signaling means, and means responsive to closure of any one of said switches for putting said signaling means into operation.

9. In an indicating system including a source of potential: the combination of a first circuit connected to said source; a plurality of control units connected in parallel in said circuit and respectively comprising a plurality of serially-connected resistances of equal value connected to one line of said circuit and a plurality of normally-open condition-responsive switches connected respectively from the ends of said resistances opposite said line to the other line of said circuit; a second circuit connected to said potential source; a plurality of other resistances serially included in one line of said second circuit; a plurality of relays for said control units respectively, said relays including normally-open contacts connected in parallel in said second circuit from the ends of said other resistances respectively, said relays including energizable actuating coils connected in said first circuit in series with said control units respectively for causing, when a switch of one of said units is operated, the relay associated with said unit to be closed; resistance-measuring means, connected to said first circuit and responsive upon one of said switches being closed, for indicating the position of said switch in its unit; and resistance-measuring means, connected to said second circuit and responsive upon closure of the said relay associated with the closed one of said switches, for indicating which of said several units includes the closed one of said switches.

10. The combination set forth in claim 9 including circuits means adapted for connecting one side of said potential source to said one line of said second circuit at a point therein beyond the farthermost one of said resistances for checking the continuity of said one line.

11. In a system for indicating overheated bearings on a railway train including a source of potential: the combination of a first circuit connected to said potential source; impedance control units associated with the cars respectively of said train and connected in parallel in said circuit, each of said units comprising impedance elements for the respective bearings of the car and thermostats associated respectively with said bearings for connecting different numbers of said impedance elements in said circuit, upon overheating of a bearing of the car, in predetermined relation according to which bearing of the car is overheated; a second circuit connected to said potential source; other impedance elements for said second circuit; relays having energizable coils serially connected with the respective control units of said cars and respectively operated in response to the overheating of a bearing on a corresponding one of said cars for connecting a predetermined number of said other impedance elements in said second circuit according to the position of the car in the train which has said overheated bearing; indicating means connected to said first circuit and responsive upon the overheating of a bearing of the train for indicating the position of said bearing on the respective car; and indicating means connected to said second circuit for indicating which car of the train has said overheated bearing.

12. In a system for indicating overheated bearings on a railway train including a source of potential: the combination of a first circuit connected to said potential source; impedance control units associated with the cars respectively of said train and connected in parallel in said circuit, each of said units comprising impedance elements for the respective bearings of the car and thermostats associated respectively with said bearings for connecting a number of said impedance elements in said circuit, upon overheating of a bearing of the car, in predetermined relation according to which bearing of the car is overheated; a second circuit connected to said potential source; other impedance elements for said second circuit; means serially connected with the respective control units of said cars and operated in response to the overheating of a bearing on any one of said cars for connecting a predetermined number of said other impedance elements in said second circuit according to the position of the car in the train which has said overheated bearing; two electrical bridges having variable arms comprising said first and second circuits respectively; and ratiometer-type indicating instruments having coils connected in said bridges respectively and responsive upon the overheating of a bearing according to the respective impedances in said circuits for identifying respectively the position of the overheated bearing on the respective car and the position of the car in the train.

13. The combination set forth in claim 12 wherein said bridges are normally disconnected from said potential source, including means controlled by said thermostats for connecting said bridges to said source upon the overheating of a bearing of the train.

14. In a system for indicating overheated bearings of a railway train including a potential source: the combination of a circuit running along said train and connected to said source; thermostats associated with the bearings of said cars respectively; a set of impedance elements of a predetermined number according to the number of cars in the train; relays on said cars respectively, controlled by said thermostats for connecting a number of said impedances in said circuit, upon the overheating of a bearing of a car of said train, in predetermined relation according to the position of the car in the train having said overheated bearing; and means connected to said circuit for indicating the positioning of the car in the train having said overheated bearing.

15. In a system for indicating overheated bearings of railway trains including a source of potential: the combination of a circuit running along said train, said circuit including detachable connectors between cars adapted to permit the cars to be connected consecutively with the cars facing in either direction; substantially equal impedance elements connected serially in one line of said circuit, there being one impedance element for each car between successive connectors and one additional element at the end of said circuit; a double-pole relay on each of said cars including two pairs of normally-open contacts connected in parallel in said circuit at opposite sides of the respective one of said impedance elements; means responsive upon overheating of a bearing of one of said cars for closing the respective relay of said car to connect as many of said impedance elements in said circuit as is the number of the car of the train having said overheated bearing; and indicating means in said circuit for indicating which car of the train has said overheated bearing.

16. The combination set forth in claim 15 including a test line running along said train, means associated with said connectors for connecting said line between cars, switch means in said connectors respectively for connecting said test line to said one line of said circuit upon the connector being disconnected, means for holding said switch means open when the respective connectors are connected, and means for supplying test current to said test line from said source whereby to test the continuity of said one line of said circuit.

17. In a bearing alarm system for railway trains including a source of potential: the combination of first and second circuits running along said train and energizable by said potential source; control units for the cars of said train respectively, said control units being connected in parallel in said first circuit, each of said control units comprising resistors and respective thermostats, said thermostats being thermally associated with the respective bearings of the car and said thermostats and resistors being arranged so that upon the closing of one of the thermostats in response to the overheating of a bearing a resistance is introduced into said first circuit having a predetermined value according to the position of the overheated bearing on the car; other resistors for said cars respectively; relays on said cars respectively and operatively connected to said first circuit, said relays and other resistors being arranged so that upon energization of said first circuit a resistance is introduced in said second circuit having a predetermined value according to the position in the train of the car having said overheated bearing; means controlled by said thermostats for giving an alarm upon the overheating of a bearing; resistance-measuring means in said first circuit calibrated to indicate the position of the overheated bearing on the respective car; and resistance-measuring means in said second circuit for indicating the position in the train of the car having said overheated bearing.

18. In a system for indicating overheated bearings on a railway train: the combination of first and second circuits running along said train; thermostats associated with the bearings of said cars respectively, one contact of each thermostat being connected to one line of said first circuit; resistors for said bearings respectively, the resistors of each car being connected serially to the other line of said first circuit, and the other contacts of said thermostats being connected to corresponding resistors at the ends thereof opposite said other line; other resistors for said cars respectively, said other resistors being serially connected in one line of said second circuit; double-pole relays for said cars respectively, each relay including a coil connected in said first circuit and a pair of contacts connected in parallel in said second circuit from opposite ends of the respective one of said other resistors; two electrical bridges having variable arms comprising said first and second circuits respectively; a normally-open current-supply circuit for said bridges; means controlled by said thermostats for closing said supply circuit upon overheating of a bearing; and ratiometer-type indicators having coils connected in said bridges respectively.

19. In a system for indicating overheated bearings of railway trains including a source of potential: the combination of a circuit running along said train, said circuit including detachable conectors between cars adapted to permit the cars to be connected consecutively with the cars facing in either direction; substantially equal impedance elements connected serially in one line of said circuit, there being one impedance element for each car between successive connectors and one additional element at the end of said circuit; a double-pole relay on each of said cars including two pairs of normally-open contacts connected in parallel in said circuit at opposite sides of the respective one of said impedance elements; means responsive upon overheating of a bearing of one of said cars for closing the respective relay of said car to conect as many of said impedance elements in said circuit as is the number of the car of the train having said overheated bearing; indicating means in said circuit for indicating which car of the train has said overheated bearing; a test line running along said train; means operative automatically upon disconnecting one of said connectors to connect said test line to said circuit at said one connector; and switch means operable to connect said test line to said source and concurrently to short said one additional impedance element.

20. In a system for indicating overheated bearings of railway trains including a source of potential: the combination of a circuit comprising two lines running along said train, said circuit including detachable connectors between cars adapted to permit the cars to be connected consecutively with the cars facing in either direction; impedance elements connected serially in one of said lines, there being one impedance element for each car between successive connectors and one additional element at the end of said circuit; operable circuit-connecting means on each of said cars including bridging means for short-circuiting said impedance element of said car and means for connecting said lines together at said car when said bridging means is in operated position; means on each of said cars, responsive to overheating of a bearing of the respective car, for operating said respective circuit-connecting means; and indicating means in said circuit for indicating which car of the train has said overheated bearing.

HAROLD L. WEINBERG.

REFERENCES CITED

The following references are of record in the file of this patent:

UNITED STATES PATENTS

| Number | Name | Date |
|---|---|---|
| 1,568,041 | Beshears | Jan. 5, 1926 |
| 2,408,660 | Lannge | Oct. 1, 1946 |

FOREIGN PATENTS

| Number | Country | Date |
|---|---|---|
| 436,755 | Great Britain | Oct. 17, 1935 |